(12) United States Patent
Middleton et al.

(10) Patent No.: US 7,590,151 B2
(45) Date of Patent: Sep. 15, 2009

(54) METHOD AND APPARATUS FOR ALIGNING TIME REFERENCES WHEN SEPARATED BY AN UNRELIABLE DATA PACKET NETWORK

(75) Inventors: Vernon Middleton, Romsey (GB); David Roe, Broadstone (GB); Paul Rushton, Winchester (GB); David Tonks, Southampton (GB)

(73) Assignee: Semtech Corporation, Camarillo, CA (US)

( * ) Notice: Subject to any disclaimer, the term of this patent is extended or adjusted under 35 U.S.C. 154(b) by 633 days.

(21) Appl. No.: 11/054,779

(22) Filed: Feb. 9, 2005

(65) Prior Publication Data
US 2005/0207387 A1    Sep. 22, 2005

Related U.S. Application Data

(60) Provisional application No. 60/543,340, filed on Feb. 9, 2004.

(51) Int. Cl.
  *H04J 3/06*    (2006.01)
(52) U.S. Cl. .................... 370/516; 370/508; 370/509; 370/512; 370/517
(58) Field of Classification Search .......... 370/299–306
  See application file for complete search history.

(56) References Cited

U.S. PATENT DOCUMENTS

| | | | | |
|---|---|---|---|---|
| 5,191,326 | A * | 3/1993 | Montgomery | 340/855.5 |
| 5,991,307 | A * | 11/1999 | Komuro et al. | 370/473 |
| 6,175,604 | B1 | 1/2001 | Noro et al. | 375/364 |
| 6,236,623 | B1 * | 5/2001 | Read et al. | 368/46 |
| 6,278,710 | B1 * | 8/2001 | Eidson | 370/394 |
| 6,373,834 | B1 * | 4/2002 | Lundh et al. | 370/350 |
| 6,483,813 | B1 * | 11/2002 | Blencowe | 370/252 |
| 6,590,890 | B1 * | 7/2003 | Stolyar et al. | 370/349 |
| 6,697,382 | B1 * | 2/2004 | Eatherton | 370/503 |
| 6,735,223 | B1 * | 5/2004 | Woo et al. | 370/516 |
| 6,834,057 | B1 * | 12/2004 | Rabenko et al. | 370/468 |
| 2002/0116468 | A1 | 8/2002 | Ishikawa | 709/208 |
| 2003/0185238 | A1 * | 10/2003 | Strasser et al. | 370/473 |
| 2003/0214982 | A1 * | 11/2003 | Lorek et al. | 370/537 |
| 2004/0264477 | A1 * | 12/2004 | Repko et al. | 370/395.62 |
| 2005/0036512 | A1 * | 2/2005 | Loukianov | 370/469 |
| 2005/0201399 | A1 * | 9/2005 | Woodward et al. | 370/412 |

* cited by examiner

*Primary Examiner*—Dang T Ton
*Assistant Examiner*—Thinh D Tran
(74) *Attorney, Agent, or Firm*—O'Melveny & Myers LLP

(57) ABSTRACT

A time control mechanism accepts samples of time (true or otherwise) over a network, and enables dynamic compensation for random delays of the network in order to maintain the output of a slave clock that the time control mechanism controls within required bounds relative to the time of a master clock, even when the samples are randomly delayed. In one embodiment, a hardware timestamping method and apparatus is provided. The hardware timestamping method and apparatus is used to achieve the fine resolution required for timestamping both received samples and transmitted requests. In another embodiment, a delay-variation-smoothing method and apparatus is provided. The delay-variation-smoothing method and apparatus allows the time control mechanism to calculate the network delay in order to maintain the slave clock within the required time bounds. Moreover, a method and apparatus is provided that not only compensates for the random delays in the samples but also dynamically adjusts its operations to suit the changing characteristics of the delay path (typically a network).

23 Claims, 9 Drawing Sheets

METHOD AND APPARATUS FOR ALIGNING TIME REFERENCES WHEN SEPARATED BY AN UNRELIABLE DATA PACKET NETWORK

RELATED APPLICATION DATA

This patent application claims priority pursuant to 35 U.S.C. § 119(c) to provisional application Ser. No. 60/543,340, filed Feb. 9, 2004.

BACKGROUND OF THE INVENTION

1. Field of the Invention

The present invention relates to the field of timing control methods and apparatus and, in particular, to a timing control mechanism for providing a copy of time, a stable frequency, and/or a signal to lock on to a remote point.

2. Background

Temporal relationships are an important aspect of the measurement and control of electronic systems. As such electronic systems become more complex and physically distributed, the accurate synchronization of time signals is increasingly necessary while at the same time difficult to achieve. To address the need for clock synchronization within network systems, the Institute for Electrical and Electronic Engineers (IEEE) adopted IEEE-1588 ("Standard for a Precision Clock Synchronization Protocol for Networked Measurement and Control Systems").

By way of example, telecommunications networks have migrated from being predominantly circuit-switched to being predominantly packet-switched. When the individual switching nodes of such networks and the circuits forming the links between them are not synchronized in a manner that makes them traceable to a common network clock, certain existing equipment will become isolated from the synchronization networks and may therefore cease to function correctly unless steps are taken to avoid this condition. Pursuant to IEEE-1588, a master-slave relationship is defined among the participating clocks communicating via the network. The slaves synchronize their local clocks to the master clock through an exchange of messages defined by IEEE-1588.

A drawback of the clock synchronization mechanism defined by IEEE-1588 is that it does not work well over a network in which nodes are separated by great distances, such as the Internet, or by networks that invoke significant message delay jitter that reduces the accuracy and stability of the slave clocks. A message communicated over such a network may pass through several repeaters, switches, and routers, thereby introducing random length delays. These random delays prevent the slave clocks from maintaining synchronization to the master clock within the required bounds.

Thus, there is a need for a timing control mechanism for a network that compensates for the random delays in the samples to be dynamically adjustable to suit the changing characteristics of the delay path (typically a network).

SUMMARY OF THE INVENTION

The present invention is directed to a time control mechanism that accepts samples of time (true or otherwise) over a network. The invention provides a method and apparatus to dynamically compensate for random delays of the network in order to maintain the output of a slave clock that the time control mechanism controls within required bounds relative to the time of a master clock, even when the samples are randomly delayed.

In one embodiment, a hardware timestamping method and apparatus is provided. The hardware timestamping method and apparatus is used to achieve the fine resolution required for timestamping both received samples and transmitted requests.

In another embodiment, a delay-variation-smoothing method and apparatus is provided. The delay-variation-smoothing method and apparatus allows the time control mechanism to calculate the network delay in order to maintain the slave clock within the required time bounds. Moreover, a method and apparatus is provided that not only compensates for the random delays in the samples but also dynamically adjusts its operations to suit the changing characteristics of the delay path (typically a network).

A more complete understanding of the system and method of the present invention will be afforded to those skilled in the art, as well as a realization of additional advantages and objects thereof, by a consideration of the following detailed description of the preferred embodiments. Specifically, the following detailed description includes a section on hardware timestamping in accordance with embodiments of the present invention and a section on delay-variation-smoothing in accordance with other embodiments of the present invention. The hardware timestamping section will describe in detail methods and apparatus used to achieve the fine resolution required for timestamping both received samples and transmitted requests. The delay-variation-smoothing section will describe how the network delay is calculated and used to maintain a slave clock within the required time bounds of a master clock. Reference will be also be made to the appended sheets of drawings which will first be described briefly.

BRIEF DESCRIPTION OF THE DRAWINGS

The drawings illustrate the design and utility of preferred embodiments of the invention. The components in the drawings are not necessarily to scale, emphasis instead being placed upon illustrating the principles underlying the embodiment. Moreover, in the drawings like reference numerals designate corresponding parts throughout the different views.

DETAILED DESCRIPTION OF A PREFERRED EMBODIMENT

Figure 1:
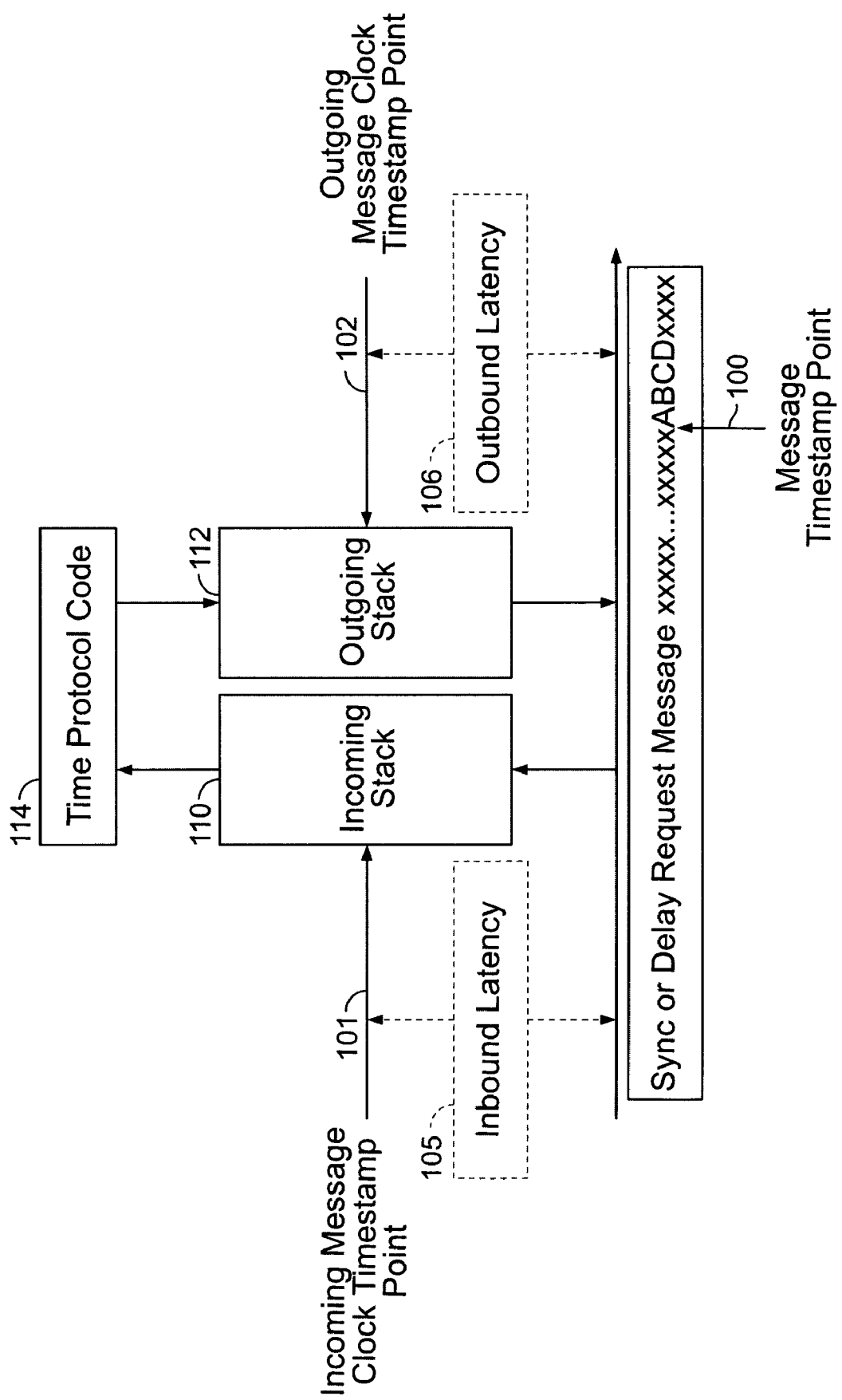
FIG. 1 illustrates incoming and outgoing message stacks in conjunction with a message timestamp point defined in accordance with an exemplary embodiment of the invention.

The present invention is directed to a time control mechanism that accepts samples of time (true or otherwise) over a network. As envisioned in an exemplary embodiment of the invention, a time control mechanism uses methods and apparatus to maintain the purity of the samples, such as error-detection and correction methods and apparatus. The envisioned time control mechanism should also adjust the output frequency and phase of a slave clock. The adjustments are controlled using other embodiments of the present invention. The slave clock controlled by an exemplary time control mechanism can be a slave clock as described in IEEE-1588. The envisioned time control mechanism is not, however, limited to applications based on IEEE-1588.

More particularly, the present invention provides a method and apparatus for the time control mechanism to dynamically compensate for random delays of the network in order to maintain the output of a slave clock that the time control mechanism controls to within required bounds relative to the time of a master clock. More specifically, a time control mechanism of the present invention maintains the slave clock output within the required bounds relative to the time of the master clock even when the samples are randomly delayed (e.g., by a network). In one embodiment, a hardware timestamping method and apparatus is used by the time control mechanism to achieve the fine resolution required for timestamping both received samples and transmitted requests. In another embodiment, a delay-variation-smoothing method and apparatus allows the time control mechanism to calculate the network delay in order to maintain the slave clock within the required time bounds. Moreover, a method and apparatus is provided to a time control mechanism that not only compensates for the random delays in the samples but also dynamically adjusts its operations to suit the changing characteristics of the delay path (typically a network).

The Time-Locked Loop

The time control mechanism as envisioned in an exemplary embodiment of the invention uses a variation of a Phase-Locked Loop (PLL). As known in the art, a PLL is an electronic circuit that controls an oscillator so that it maintains a constant average phase angle (i.e., lock) on the frequency of an input, or reference, signal. A PLL ensures that a communication signal is locked on a specific frequency and can also be used to generate, modulate and demodulate a signal and divide a frequency. The time control mechanism of the present invention uses samples of time in place of phase, and is hence called a Time-Locked Loop (TLL). While the two techniques operate on similar principles, the TLL uses samples of time that have been sent to it by another clock, rather than sampling an incoming signal to obtain samples of phase, which is the technique used in a PLL.

A TLL is generally made up of components of which some may be assembled together in one place and others in another place. The separation between the two assemblies may be large. The TLL has one assembly which generates a series of instantaneous time values from a master clock source, and another assembly which uses these time values to build a replica of the master clock as the slave clock output. The part of the TLL that generates the time samples from the master clock source is termed the master clock, and the other part is termed the slave clock. The master clock generates the time values simply by sampling a counter driven at a rate controlled by the master clock source. The counter is reset at the beginning of an epoch but runs continuously until the epoch is reset. The time values are not affected in any way by the actions of the slave part of the TLL.

The slave clock controls an oscillator such that a counter being driven by the oscillator, and using the same epoch as the master, runs in alignment with the master clock. The slave clock compares the time values sent to it by the master with corresponding time values that it obtains by sampling the counter when it receives a new time sample from the master. Taking account of the time delay in transmission, the slave clock controls the rate of the oscillator until it (a) runs at the same rate as the master clock and (b) the counters are aligned. The slaves use samples of master time provided in messages from the master and samples of slave time from its own clock, and drives the slave clock faster or slower until it matches the master time. Thus, the slave clock output is locked to the time of the master clock.

Figure 11:
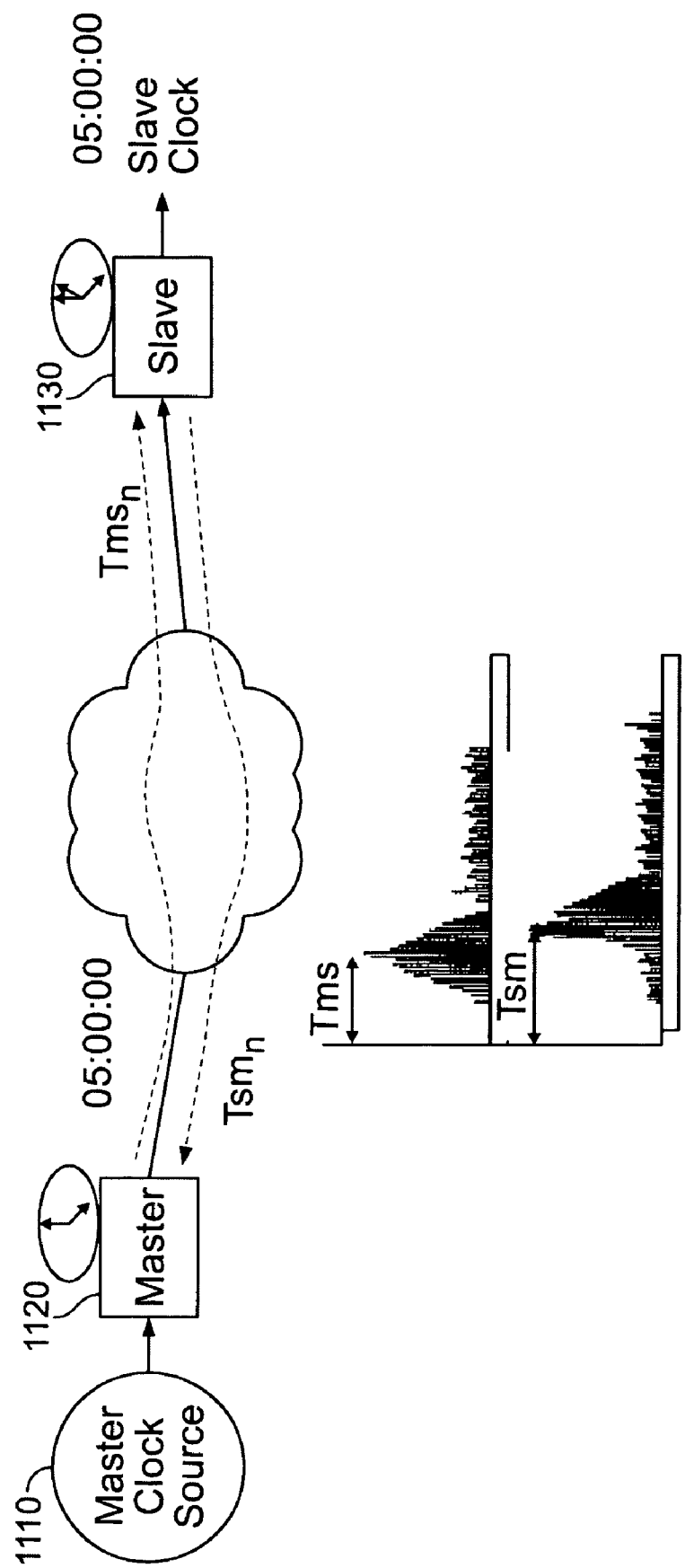
FIG. 11 illustrates communication of message packets between a master and slave in accordance with the present invention.

As shown in FIG. 11, clock synchronization information is exchanged between a master and slave in accordance with the present invention. A master clock 1120 receives a clock from a reliable source 1110, such as Coordinated Universal Time (UTC). The master clock 1120 sends a sample of the clock in a message to a slave clock 1130, on the way passing through various network nodes that introduce random length delays, and the slave responds by sending a message signal back to the master. The transmit time of the master-to-slave message ($T_{ms}$) may differ for each message, reflected in the variable length delays measured. Similarly, the transmit time of the slave-to-master messages ($T_{sm}$) may also reflect variable length delays. The slave uses the time samples received from the master to determine whether the slave clock 1130 is out of synchronization from the master clock 1120, taking into account the transmission time delay. Timestamps in the messages can be further used to quantify the transmission time delay.

The difference between the TLL and the PLL is that the PLL follows the average frequency of its input (essentially attenuating noise on the input), while the TLL follows the frequency of the master clock source, and accommodating variations of the delay in the transmission path suffered by individual time samples.

An advantage of the TLL is that it operates irrespective of the frequency of the signal that delivers the time samples from the master clock. Under the conditions where a conventional PLL chain departs from ideal behavior, namely when a PLL has to drift, the TLL maintains good alignment between the master and slave clocks. Further, when the master and slave parts of a TLL are separated by a network that has a variety of transmission technologies, such as SONET and Ethernet, a PLL chain would not be able to synchronize the various nodes in the network, whereas the TLL can still do so.

Another advantage of the TLL is that the time samples can be sent independently of the nature of the transmission path between the slave clock and its controlling clock. Different sections of the transmission path can have very different characteristics and can be designed to very different standards. For example, one section of the path could be designed in accordance with Ethernet, while another section could be SONET. These are not the only combinations possible. In contrast, a PLL is dependent on the nature of the transmission path, and suffers from any anomalous behavior of the path. For example, a PLL which was located at the end of a transmission path which held both Ethernet and SONET sections would generally not meet the same performance criteria as the TLL since the frequency of the Ethernet section could be anywhere within a much wider range than is allowed for SONET. Thus, the Ethernet clock may not always be transportable to the PLL. This situation is quite common and is avoided by the TLL.

Another problem with PLL's is that they are frequently provided (or ganged) one after another along a transmission path and the performance of any PLL farther from the source is strongly affected by the performance of its predecessors in the path. To achieve a desired overall performance at the end of the path typically requires that the behavior of each PLL remains within certain tight bounds and that the number of PLL's in the path be limited. This increases the expense of the transmission path and limits its extent. On the other hand, the TLL uses samples of time that have been obtained at the beginning of the path and these samples are generally unpolluted by individual elements of the transmission path and so the transmission path can extend as far as necessary. The time control mechanism in an embodiment of the present invention compensates for any irregularities in the path delay and corrects any detectable and correctable errors in the time samples. The TLL, therefore, is divorced from the behavior of the transmission path.

Protection Against Anomalous Network Behavior

Networks frequently introduce errors in the samples. These may be single-bit errors or may extend over many bits. Embodiments of the present invention use a time control mechanism that protects itself from these by using either an error-correction technique, or by discarding the sample. The use of error-correction is limited to cases where the error can be reliably detected, and several techniques are commonly used within the industry. The error-correction technique used has to be negotiated between the time control mechanism and the master clock.

Networks sometimes suffer failures that remove sections of the transmission path from service. A typical example would be the severance of a cable by roadwork. It is usual to provide an alternative section to restore the transmission path and this restoration is usually invoked automatically by the network operator. The time control mechanism has the ability to maintain the output of the slave clock within the required bounds for prolonged periods of network outage, and can compensate for the different delay of the new transmission path. Alternatively, it can be supplied with time samples over different paths from the selected master clock, or can be supplied with samples from more than one master clock. Should the used path to or from the selected master clock not be repaired in time, the time control mechanism can switch to an alternative route or to an alternative source.

In addition, networks sometimes invoke new routes to avoid congested or failed nodes. This would typically introduce a different delay in at least one direction. The time control mechanism of an envisioned embodiment compensates for this. Moreover, should the selected master clock fail, the time control mechanism can switch to an alternative if one is available. The time control mechanism of the envisioned embodiment will compensate for the different path delays.

Hardware Timestamping

As described above, an aspect of the present invention is to provide a hardware timestamping method and apparatus. IEEE-1588 requires that the timestamps be performed with the absolute minimum of latency. A conventional software stack adds a very significant latency and, more importantly, a very significant variation in latency. Thus, instead of using a software stack, embodiments of the present invention perform timestamping in hardware. In a time control mechanism of the present invention, timestamping is performed by dedicated hardware that sits very close to the physical interface port to give the best possible performance.

In one embodiment, the hardware timestamping is performed by the time control mechanism on both incoming and outgoing packets in accordance with IEEE-1588. Pursuant to IEEE-1588, every slave synchronizes to its master's clock by exchanging synchronization messages with the master clock. The synchronization process is divided into two phases. First, the time difference between master and slave is corrected, referred to as the offset measurement. During this offset correction, the master cyclically transmits a unique synchronization (Sync) message to the related slave clocks at defined intervals (e.g., by default every 2 seconds). This Sync message contains an estimated value for the time the message was transmitted. The master clock measures the exact time of transmission and the slave clocks measure the times of reception. The master then optionally sends in a follow-up message the time of transmission of the corresponding Sync message to the slave clocks. On reception of the Sync message and on reception of the optional corresponding follow-up message, the slave clock calculates the correction (offset) in relation to the master clock taking into account the reception time stamp of the Sync message. The slave clock must then be corrected by this offset. The second phase of the synchronization process, the delay measurement, determines the delay or latency between slave and master. The slave clock sends a Delay Request message to the master and determines the time of transmission of the message. The master generates a time stamp on reception of the packet and sends the time of reception back to the slave in a Delay Response message.

FIG. 1 illustrates a message timestamp point 100 defined relative to an incoming message stack 110 and an outgoing message stack 112. Sync messages (i.e., messages or packets broadcast by the master to all of its slaves) and Delay Request messages (i.e., messages or packets transmitted by a slave to its master) are communicated to either the incoming stack 110 or outgoing stack 112, and are subsequently processed by suitable time protocol code 114. The message timestamp point 100 is a defined position in the message format (e.g., shown in FIG. 1 as the beginning of the A in the message). Clock timestamp points 101, 102 are physical points in the incoming stack 110 and outgoing stack 112, respectively, where the message pass through. When the message timestamp point 100 passes these physical points, the incoming and outgoing clock timestamp points 101, 102 are generated. As is shown in FIG. 1, a typical Sync or Delay Request message enters the inbound protocol stack 110. The inbound latency 105 and outbound latency 106 are intended to be miniscule in the present invention; however, when a physical device adds a latency, it is anticipated to be able to read a register for the device and use this value in the determination of the clock synchronization. As further described below, embodiments of the present invention provide a mechanism for generating the timestamps to be placed on this defined timestamp point 100.

Figure 2:
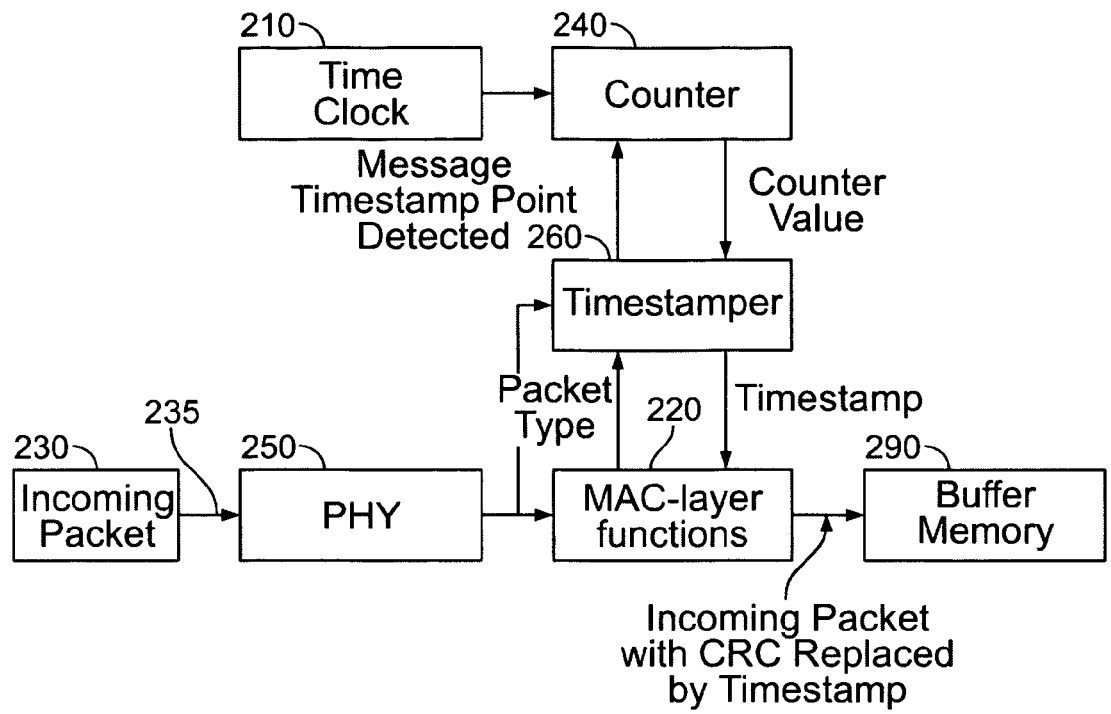
FIG. 2 illustrates an exemplary hardware timestamp mechanism for incoming packets to the incoming message stack of FIG. 1.

FIG. 2 is a block diagram of an exemplary mechanism used to timestamp incoming packets in accordance with an embodiment of the present invention. This mechanism may be used in either a master clock or a slave clock location. Incoming packets 230 arrive on an incoming port 235 of a physical layer 250 and are passed to a Media Access Control (MAC) layer 220 for processing before delivery to a buffer memory 290. When the packet 230 arrives at the MAC layer 220, the timestamper 260 detects the message timestamp contained in the packet 230 and provides this data to the counter 240. A time clock 210 drives the counter 240, which is responsible for producing the counter (or timestamp) value.

In the case of a master clock implementation, the time clock 210 is the master clock; in the case of a slave clock implementation, the time clock 210 is the slave clock. The counter value is latched in the counter 240 to be used as the basis for the timestamp that is inserted in the packet at a later point. At the same time, the packet is processed at the MAC-layer 220. The packet is discarded if significant errors are found.

If the MAC-layer 220 recognizes the packet as being a Sync packet type (or a Delay-Request packet), it communicates with the timestamper 260, which retrieves the timestamp value from the counter 240 and passes it to the MAC-layer 220 for insertion into the packet. In this particular embodiment, the timestamp value is inserted in the packet in place of the cyclic redundancy check (CRC) value once the value has been validated. This has the additional advantage of maintaining the length of the packet and of maintaining the timestamp with the packet, both of which simplify packet processing. It should be appreciated that any other methods can be employed, if desired, and the change in packet length would then have to be taken into account by subsequent packet processing functions. The timestamp stays with the packet as it is processed and can be used where necessary and can also be retained by a buffer memory 290 for re-transmission if necessary. In the context of the present invention, this counter 240 can also be called a "Timestamp Generator."

The time clock may run at a range of frequencies. For example, a rate of 77.76 MHz or 100 MHz gives a resolution of 12.86 ns or 10 ns, though it should be appreciated that other rates can be used. Other clocking signals can also exist in the mechanism, for various purposes known in the art. The incoming port 235 may be driven by a line clock that has no relationship with the time clock 210. The line clock may also drive functions of the MAC layer 220. The possibility of data errors caused by metastability should also be taken into account and minimized. To give maximum flexibility, various features of the above described timestamp mechanism of the present invention are configurable. For example, the mechanism should be configurable at the point in the packet at which the timestamp can be generated, at the format of the timestamp as it is written into the packet, and/or at the location and format of the packet identification label.

Figure 3:
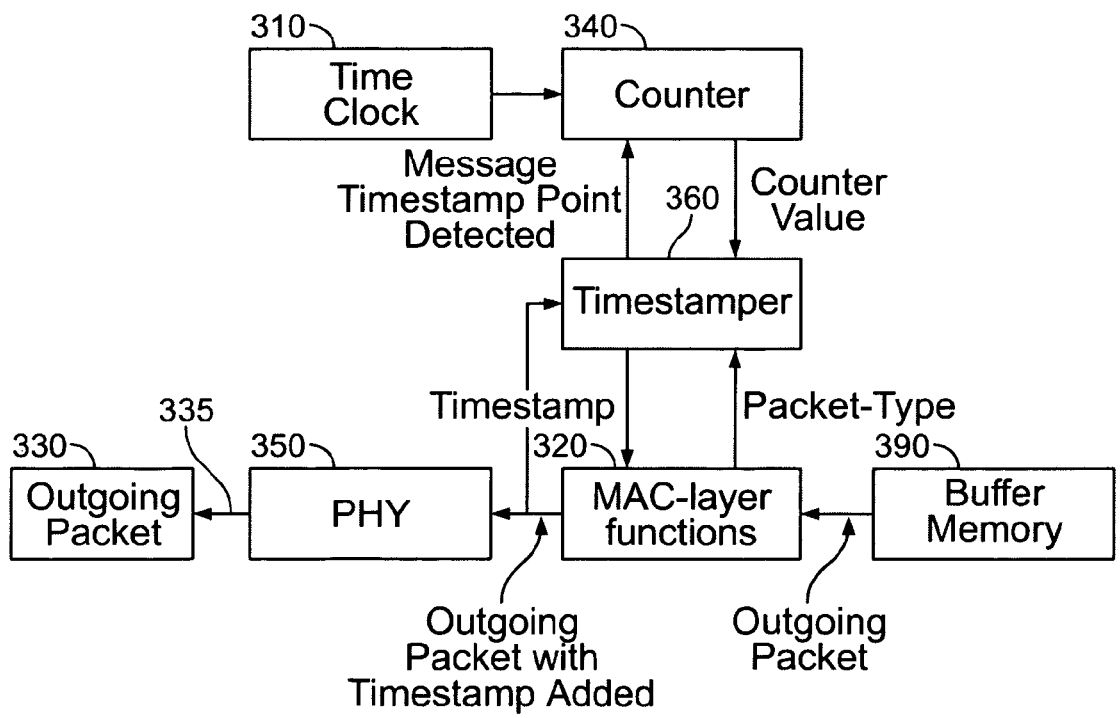
FIG. 3 illustrates an exemplary hardware timestamp mechanism for outgoing packets to the outgoing message stack of FIG. 1.

FIG. 3 is a block diagram of a timestamp mechanism used to timestamp outgoing packets. This mechanism can be used in either master clock or slave clock applications. Outgoing packets 330 go from a buffer memory 390, to the Media Access Control (MAC) layer 320, to the physical layer 350, and are transmitted on an outgoing port 335. The mechanism includes a counter 340 that is driven by the time clock 310. In a master clock application, this would be derived from the master clock; in a slave clock application it would be derived from the slave clock. The counter 340 produces a value that will be used as the basis of the timestamp value. As a packet leaves the timestamp mechanism, the outgoing timestamper 360 detects when the message timestamp point in the packet has arrived at the output port 335 and indicates this event to the counter 340. The counter value is latched and passed to the timestamper 360. Normally, the timestamp value is intended to be inserted only in Sync or Delay-Request packets (or packet types), so the timestamper 360 detects the packet-type through communication with the MAC-layer 320. If the packet is of the appropriate type, the timestamper 360 passes the timestamp (i.e., the counter value) to the MAC-layer 320 for processing the insertion of the timestamp in the appropriate point in the outgoing packet.

In addition to Sync and Delay-Request packets, the above described timestamp mechanism can also insert timestamps in other types of packet if required. This is useful in applications that require timestamps, such as billing applications.

Similar to the embodiment of FIG. 2, many features of the present outgoing timestamp mechanism are configurable to suit various applications. For example, the features should be configurable as to the packet-types to which timestamps are to be added, to the format of the outgoing timestamp, to the position of the timestamp in the outgoing packet, and/or to the message timestamp point in the outgoing packet which triggers the generation of the timestamp. In addition, the interaction of the various functions should also be configurable. For example, the position of the timestamp in the outgoing packet can be varied to suit different packet types and/or the format of the timestamp can be varied with different packet types.

Delay-Variation-Smoothing

As also discussed above, another aspect of the invention is to provide a delay-variation-smoothing method and apparatus. The delay-variation-smoothing method and apparatus allows the time control mechanism to calculate the network delay in order to maintain the slave clock (node) output as an accurate representation of its master's input, within the time bounds required by the application. Moreover, a method and apparatus is provided by the present invention to a time control mechanism that not only compensates for the variable delays in the samples but also dynamically adjusts its operations to suit the changing characteristics of the delay path.

A. Packet Acceptance

As described above, packets that carry samples of time to a time control mechanism will be delayed by variable amounts of time by a network over which they are carried. The time control mechanism can only use the time samples if it can work out the delay suffered by each packet to within an acceptable margin of error. The packet acceptance method and apparatus of the present invention is responsible for this determination.

The delay introduced by the network can be broken down into two parts. One part of the delay will be the propagation delay of the packet between the master clock and the slave. This delay is caused partly by the propagation speed over the combined lengths of the physical media in the network and partly by unavoidable processing delays in the nodes of the network. It represents a minimum delay and is relatively fixed by physical attributes, provided the propagation path is the same for each packet.

In addition to the propagation delay, there will be a variable delay introduced by the network, which is caused by the need to share ongoing links of the nodes in the path between packets from various sources, making a node sometimes unable to pass on a packet as soon as it arrives. The packets arriving at a node are held in a queue and can only move forward when the ongoing link is free. The delay caused by the queue is called the queuing delay and can be widely variable depending on traffic load and the mix of packet types. The queuing delay can, on average, be minimized if network nodes can give preference to high-priority packets. For example, sync packets carrying time samples would be marked as high priority. Particularly on lightly-loaded networks, this would typically result in sync packets being only slightly delayed at a network node. More frequently, though, a high-priority packet must wait if a node is already sending out a packet, the high-priority packet being sent as soon as the current packet has completed. This is the statistical multiplexing nature of packet networks and results in the variation of the packet delay. The prioritizing of the packets helps to reduce this delay. Despite this prioritizing by the network, a network node can occasionally receive several high-priority packets concurrently. Accordingly, the network cannot guarantee to minimize the delay for any particular sync packet. Such queuing delays can be minimized by using high-speed nodes but this becomes much longer when lower-speed nodes are also involved as is the case in some network configurations. Another cause of varying delays is the changing of the propagation path through the network. To allow the time control mechanism to provide the service it offers, the propagation path must remain the same for as long as possible. The time control mechanism can adapt to a new path delay but the new path should be stable for a period of time before it is changed.

The variation in queuing delays is typically much greater than the relatively fixed delay caused by the physical attributes of the network. A variation in delay caused by a change in the network path would be expected to be a constant offset, and can be recognized and compensated for.

Irrespective of the packet delay, the time control mechanism has to operate within the required performance bounds. The packet acceptance algorithm of the present invention is key to the performance of the time control mechanism in the face of widely-varying packet delays described above. The aim is to remove the queuing delay and to expose the fixed delay in order that the slave clock can be brought into proper alignment with the master clock.

A measure of the delay suffered by a packet during transmission can be obtained by comparing the time sample carried in a received packet with the local time at the slave clock. This value includes both the fixed-delay and the queuing-delay components and the offset between the master and slave clocks. Although the queuing delays will have a distribution that is dependent on network architecture and traffic conditions, and can change over time and between networks, the distribution of the delays will typically show a favoritism toward a certain narrow range of delays, so that most packets will be delayed within the range and fewer packets will be delayed either more or less than the range. If a conventional filter was used to find the average delay, with all packets having equal weighting in accordance with an exemplary algorithmic embodiment, the packets having the rarer delays would have a disproportionate effect on the filtering and the time control mechanism would take longer to find the average delay. By use of the foregoing term "average" with respect to the measurement of delay, and throughout the following discussion, it should be understood that either of a mode, mean or median calculation could be advantageously utilized in appropriate circumstances.

An algorithmic embodiment (or algorithm) used by a time control mechanism of the present invention recognizes that packets having delays nearer to the average value should be given greater precedence than those further away, leading to a much-reduced settling time. The algorithm of the present invention uses the packet delay's relative density value to determine the weighting, as explained later. A benefit of this approach is that it avoids the pollution caused by occasional packets which have a rare delay. With a delay profile which approximates a Gaussian distribution, for example, the algorithm of the present invention reduces the contribution to the delay calculation of packets that have a very short or a very long delay, thereby preventing the skew.

More specifically, in one embodiment of the present invention, the fixed-delay value that depends on the path through the network can be calculated using the delay-request procedure, whereby the master clock responds to delay-request packets sent by the slave. The reply contains the time at which the master clock received the delay-request packet. By knowing the local times at the slave clock at which the delay-request packet was sent and received, and making allowance for the queuing delay suffered by the packets, the time control mechanism of the present invention can calculate the fixed delay and thereby adjust the local time to bring it into alignment with the master clock.

Once the average delay and fixed delay have been determined, the time control mechanism can calculate when a new packet was transmitted by the master and then determine if the clocks are drifting apart. If so, the slave clock frequency can be controlled to maintain alignment.

The master clock cannot always send time samples at precisely regular intervals. It may have a significantly large processing load of its own and this will affect its behavior. For example, it may have a large number of slave clocks to control and each will be sending delay-request packets to which the master has to quickly respond, in addition to sending its usual time sample packets. Therefore, in addition to delay variation, the slave clock has to contend with varying inter-packet gaps.

Figure 4:
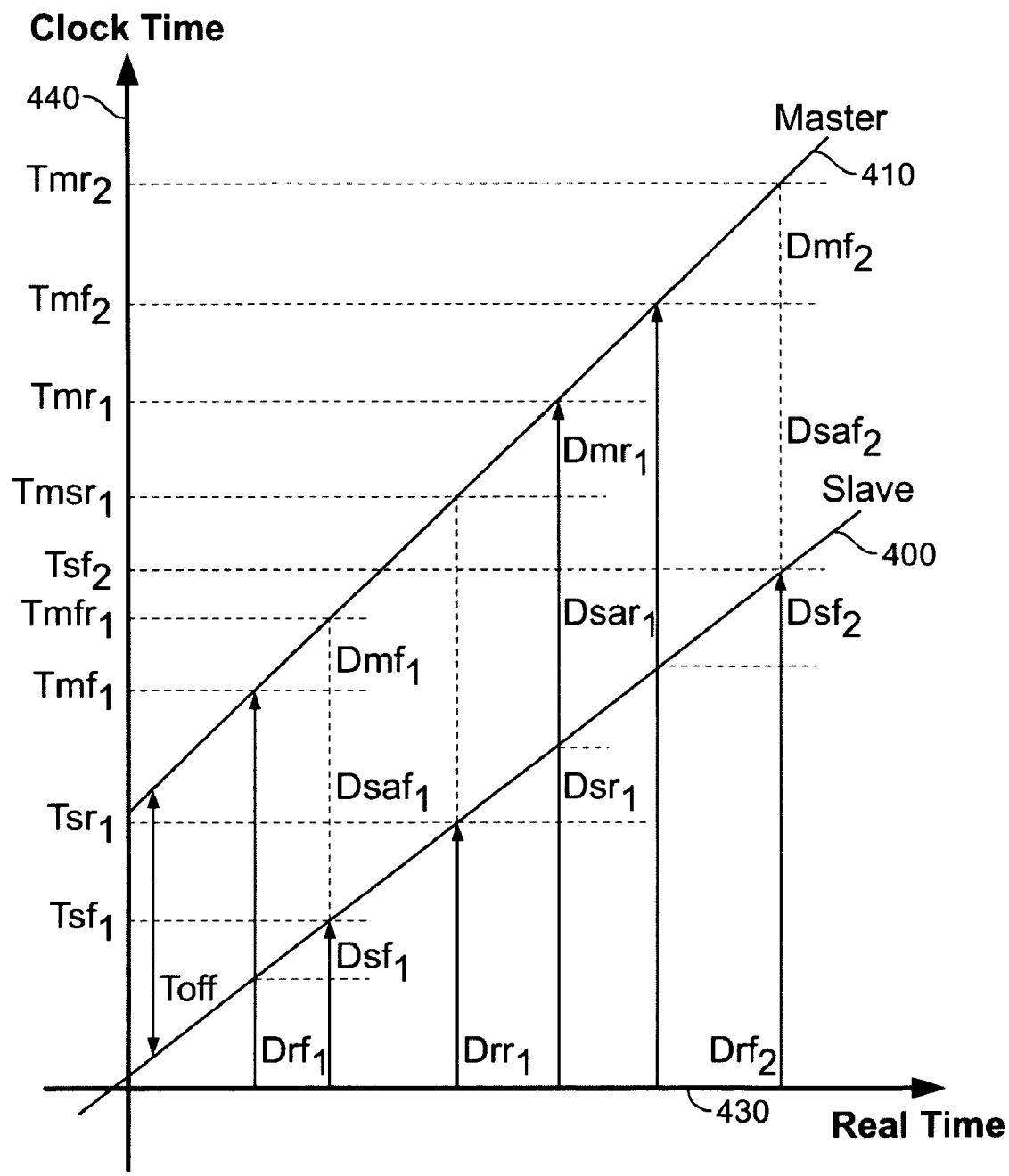
FIG. 4 is a graph illustrating master and clock time relative to real time.
Figure 5:
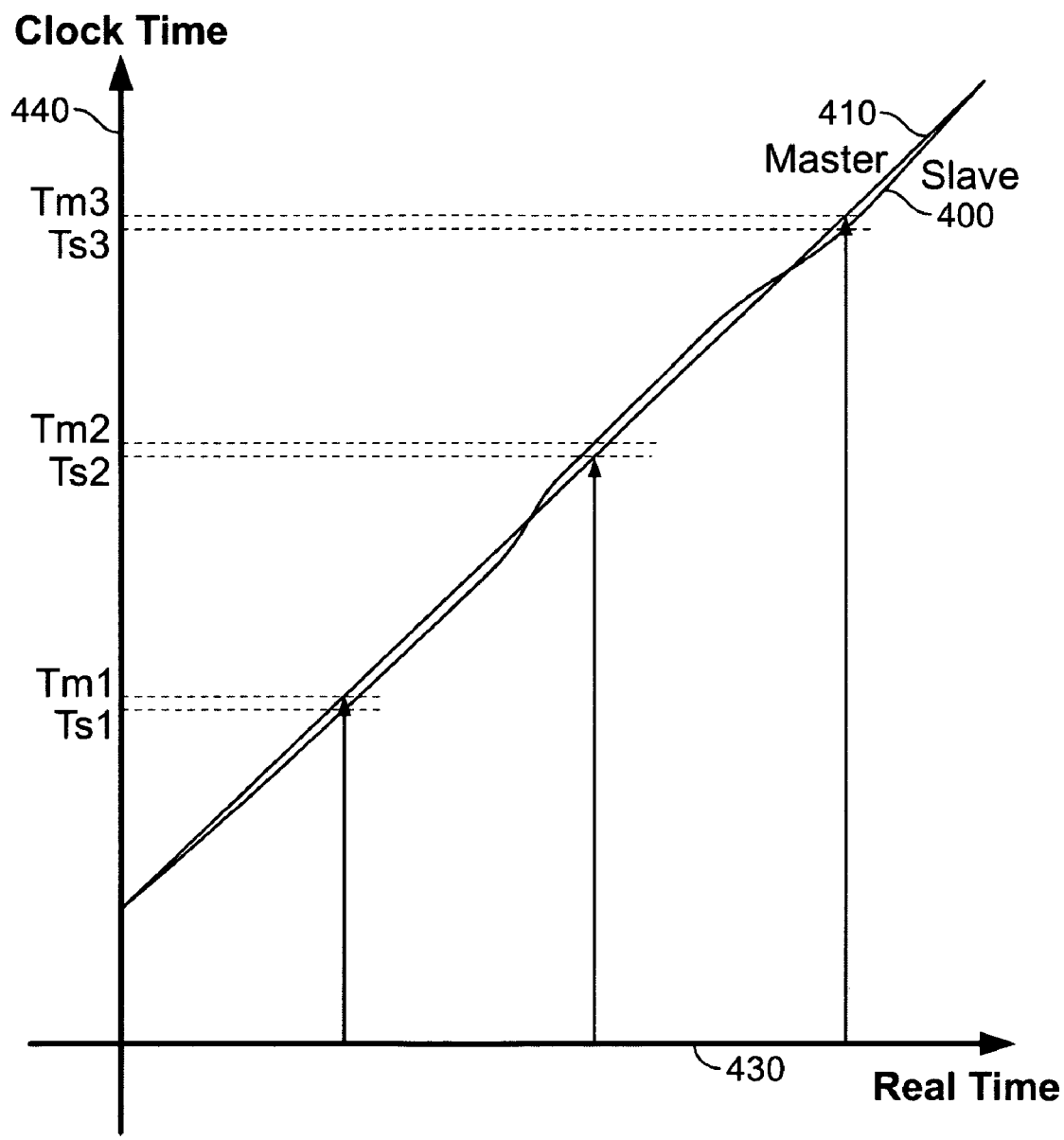
FIG. 5 is a graph illustrating master and clock time relative to real time, aligned in accordance with an exemplary embodiment of the invention.

To illustrate the principles on which an algorithmic embodiment of the present invention is based, FIG. 4 shows an example in which the slave clock is initially running late and at a slower rate than the master clock. FIG. 5 shows the situation when the clocks have been aligned.

Referring now to FIG. 4, the slave clock 400 is running behind the master clock 410 and at a slower rate (frequency). The apparent delay is increasing over time. The offset time, $T_{off}$, which is the apparent time offset between the master and slave clocks, has increased to a larger value. The frequency of the slave clock needs to be adjusted to stabilize the average apparent delay and so make the slave clock run at the same rate as the master clock. The slave time is also adjusted until the average apparent delay from master to slave equals the average one-way delay. The two clocks would then run as illustrated in FIG. 5.

Referring back to FIG. 4, the horizontal axis 430 represents real time (e.g., UTC) and the vertical axis 440 represents clock time (either master clock or slave clock). The upper trace 410 represents the change in master clock time over real time—if the slope is 1:1 then the master clock time is perfectly aligned to real time, but running fast or slow causes a steeper or shallower slope. The lower trace 400 represents the change in slave clock time over real time. Both traces 400, 410 are shown as continuous lines but would, in reality, be piecewise-linear to reflect the limited finite resolution available to the clocks. The step size would reduce with finer resolutions. The two traces 400, 410 are offset by an offset error, $T_{off}$, that will be constant if the two traces 400, 410 are parallel, but would vary if they are not. The aim of the system is to eliminate $T_{off}$. The master generates sync packets at times, $Tmf_n$, as measured by its own clock, which it sends to the slave in the forward direction (master-to-slave). The send time, $Tmf_n$, is contained in the packet, within an accuracy determined by the timestamping (described above). The slave receives these packets at apparent times, $Tsf_n$, as measured by its own clock. The accuracy of the reception will be affected by the accuracy of the timestamping in the receiver. The network will delay the packets by a delay time, $Drf_n$, measured in real time, or $Dmf_n$ measured by the master clock, or $Dsf_n$, when measured by the slave clock. When $Dmf_n=Drf_n$, the master is running accurately to real time. When $Dsf_n=Dmf_n$ the slave is running in alignment with the master. The slave will see an apparent delay for each received packet of $Dsaf_n$, where $Dsaf_n=Tsf_n-Tmf_n$. A packet sent by the master at $Tmf_n$ (=$Tsf_n+Dsaf_n$) and delayed by the network by $Drf_n$ would then be received by the slave at slave time $Tsf_n$, at which time the master clock reads $Tmfr_n$ (where $Tmfr_n=Tmf_n+Dmf_n$). Since $Tmf_n=Tsf_n+Dsaf_n$, $Tsf_n=Tmf_n-Dsaf_n$ and, if the clocks are truly aligned, $Tsf_n=Tmfr_n$. Therefore, $Tsf_n=Tmf_n+Dmf_n$, or $Dsf_n=Dmf_n$, as required to have the two clocks aligned. There will be an error, δ, due to the accuracy of the timestamping and also due to deviations of the master clock from real time. The first source of error is minimized using the hardware timestamping techniques of the present invention as described above. The second source of error should be corrected based on techniques known in the art. A time control mechanism of the present invention is used to align to master time, not real time. In this case, it is up to the master to maintain alignment with real time if the overall system is to provide real time at the slave output.

To align the slave clock to the master clock, an algorithm of the present invention has to reduce and maintain the offset time, $T_{off}$, below an acceptable threshold. The above reasoning shows that the clocks are aligned when $Dsf_n$ is equal to $Dmf_n$, but this also requires that there be no offset time. It can be safely assumed that the slave will start up with an offset time value, which may put it either ahead of or behind the master. Here, $T_{off}$ has a positive value if the master clock time leads the slave clock time. The slave can remove some of the offset by simply changing its time to adopt that given in a received packet, but it will be in error by the forward flight time (in this case, the forward network delay, $Drf_n$, incurred by the packet which carried the sample of master time). To remove this error, the slave has to work out the network delay incurred by the packet. Since the delay will usually vary and be dependent on things that are outside the control of the slave, the error removal task uses certain approximations. A first approximation, though, may be obtained as follows. If, during the flight time of the packet, the rates of change of both the master and slave clocks are near enough equal to the rate of change of real time (so that the two clocks increase at about the same rate, even if they have a fixed offset time), then $Dsf_n$ is approximately equal to $Dmf_n$, and approximately equal to $Drf_n$. Therefore, if the slave has roughly aligned itself by adopting the master value, $T_{off}$ would be approximately equal to $Dsf_n$ (or $Dmf_n$). Finding either $Dsf_n$ or $Dmf_n$ would allow $T_{off}$ to be reduced further.

A slave of the present invention should further calculate an apparent delay for the forward path, $Dsaf_n$, when it receives a new packet. The packet will contain the latest sample of the master time, $Tmf_n$, and it will be received at slave time, $Tsf_n$. The master time, $Tmf_n$, and the slave time, $Tsf_n$, are both known by the slave, so $Dsaf_n$ will be equal to $Tsf_n-Tmf_n$. However, this will be in error by $T_{off}$. Therefore, $Dsaf_n=Tsf_n-Tmf_n=Dsf_n-T_{off}$, giving $Dsf_n=Tsf_n-Tmf_n+T_{off}$. The slave time on receipt of a packet, $Tsf_n$, will equal the master time in the packet, $Tmf_n$, plus the particular forward path delay suffered by the packet, $Dsf_n$, minus the error, $T_{off}$: $Tsf_n=Tmf_n+Dsf_n-T_{off}$. Therefore, $Dsf_n=Tsf_n-Tmf_n+T_{off}$.

Under ideal conditions, each direction of a round-trip path would contain the same time offset error but with opposite sign in each direction. The round-trip delay, under ideal conditions, would thus have no time offset error. In the case of a network that does not support a true round-trip measurement, the true round-trip should be emulated using the normal forward path (master-to-slave), in conjunction with the delay-request procedure (which uses the return path). A delay-request packet can be sent by the slave and noted by the master. The slave notes the slave time when it sends the packet, $Tsr_n$, at which point the master has the time, $Tmsr_n$, which is offset from the slave time by the offset time, $T_{off}$, so that $Tmsr_n=Tsr_n+T_{off}$. The master timestamps the packet when it receives it, at $Tmr_n$. During the flight time of the packet the master and slave will have advanced by $Dmr_n$ ($=Tmr_n-Tmsr_n$) and $Dsr_n$, respectively, so that $Tmr_n=Tmsr_n+Dmr_n$. The master then sends a new packet to the slave with the timestamp value, $Tmr_n$, enclosed. Preferably, this is done as soon as possible but does not have to be done immediately.

When the slave receives the packet, it recovers the master timestamp value, $Tmr_n$, and compares it to the time when it sent the delay-request packet, $Tsr_n$. The two values will differ by the apparent reverse-path delay, $Dsar_n$, measured by the slave clock, which includes the offset error, $T_{off}$. The master timestamp value in the received packet, $Tmr_n$, will be equal to the master time when the slave sent the delay-request packet, $Tmsr_n$, plus the reverse path delay, as measured by the master, $Dmr_n$: $Tmr_n=Tmsr_n+Dmr_n$. When the slave clock runs at near enough the same rate as the master clock, the reverse path delay measured by the slave, $Dsr_n$, would be very nearly equal to the reverse path delay measured by the master, $Dmr_n$; therefore, assuming $Dsr_n=Dmr_n$, $Tmr_n=Tmsr_n+Dsr_n$, or $Tmr_n=Tsr_n+T_{off}+Dsr_n$. Therefore, $Dsr_n=Tmr_n-Tsr_n-T_{off}$. The round-trip delay is the sum of the two one-way delays, $Dsf_n+Dsr_n$, and equals $(Tsf_n-Tmf_n+T_{off})+(Tmr_n-Tsr_n-T_{off})$. Therefore, $Dsf_n+Dsr_n=(Tsf_n-Tmf_n)+(Tmr_n-Tsr_n)$.

If the relationship between the delays in each direction is known, the time offset error, $T_{off}$, can be found and eliminated to align the slave clock to the master. A good working assumption, which is valid in many cases, is that the delays are near enough equal in each direction. Then, $Dsf_n=Dsr_n=((Tsf_n-Tmf_n)+(Tmr_n-Tsr_n))/2$. If delays are constant, then the slave clock is aligned to the master clock if it is a value, $Dsf_n$, behind the sample of master time, $Tmf_n$.

The above discussion is for exemplary purposes only. It is derived from conditions encountered based on system using the IEEE 1588 standard. It applies only to the most simplistic of situations and the invention is not limited thereby. The above example may not be applicable under more onerous conditions found in some applications and various modifications, adaptations, and alternative embodiments thereof may be made. More specifically, under certain difficult conditions, there are several areas that lead to errors. The discussion above requires that the delays be constant and the same in each direction; it also requires that the time offset error, $T_{off}$, be constant. As is mentioned above, the delay through the network is not constant but can vary widely over time in many applications. Further, the delays may not be equal enough in each direction. Finally, the time offset error may change over time if the rate of change of either the master or slave clock varies over time. The most troublesome source of error is the variation in delay. This would lead to an error that could range from the smallest possible delay to the largest. This error would be present all the time if no control mechanism were employed to correct for it. In many applications, a permanent, large error is unacceptable, so a control mechanism has to be employed to correct for it. The following discussion describes the principles behind a particular control mechanism of a more specific embodiment of the present invention.

B. Control Mechanism for Unknown Delay

A control mechanism to correct for an error caused by an unknown delay, which can vary widely over time, is desired. The use of a simple averaging filter to identify the average value of the delays encountered is not ideal for this application because it has several undesirable features, including a very slow reaction to a new delay range (such as could be caused by a change in network path). Also, the same slow response would lead to a prolonged alignment time, which may not be acceptable to some important applications. An embodiment of the present invention uses a control mechanism that identifies the most-likely delay value in each direction of the path and uses this to align the slave clock to the master. This embodiment is generally applicable in any situation for quickly finding a typical delay amongst an ongoing set of delay values, and is not restricted to the application served by the time control mechanism described herein.

If a packet is delayed between the master and slave clocks by a most-likely delay, Dsm, and the slave time, on receiving the packet, is ahead of the sample of master time contained in the packet by the same amount, then the slave clock is in alignment with the master. Based on the relation derived above for the round-trip delay, $Dsf_n+Dsr_n=(Tsf_n-Tmf_n)+(Tmr_n-Tsr_n)$, the most-likely one-way delay in the master-to-slave direction is the accepted proportion of the sum of the weighted averages of the successive set of values of $Tsf_n-Tmf_n$ and $Tmr_n-Tsr_n$. In the simplest case, the accepted proportion is one half of the round-trip delay, but this can change if a better proportion is known.

The weighted average value of the master-to-slave delay, $[Tsf_n-Tmf_n]_{wa}$, is obtained by filtering the output of the relative density weighted acceptance procedure (described later) when it is supplied with successive values of apparent forward delay, $Tsf_n-Tmf_n$. The value, $Tsf_n$, is the value of the slave clock when the slave receives a packet containing a sample of the master clock, $Tmf_n$. Each new packet generates a new sample of apparent forward delay, $Dsaf_n=Tsf_n-Tmf_n$. Each new sample is supplied to a relative density function (for measuring the range of delays suffered by a number of packets) and then supplied to a compound filter together with the acceptance value for that sample.

Figure 7:
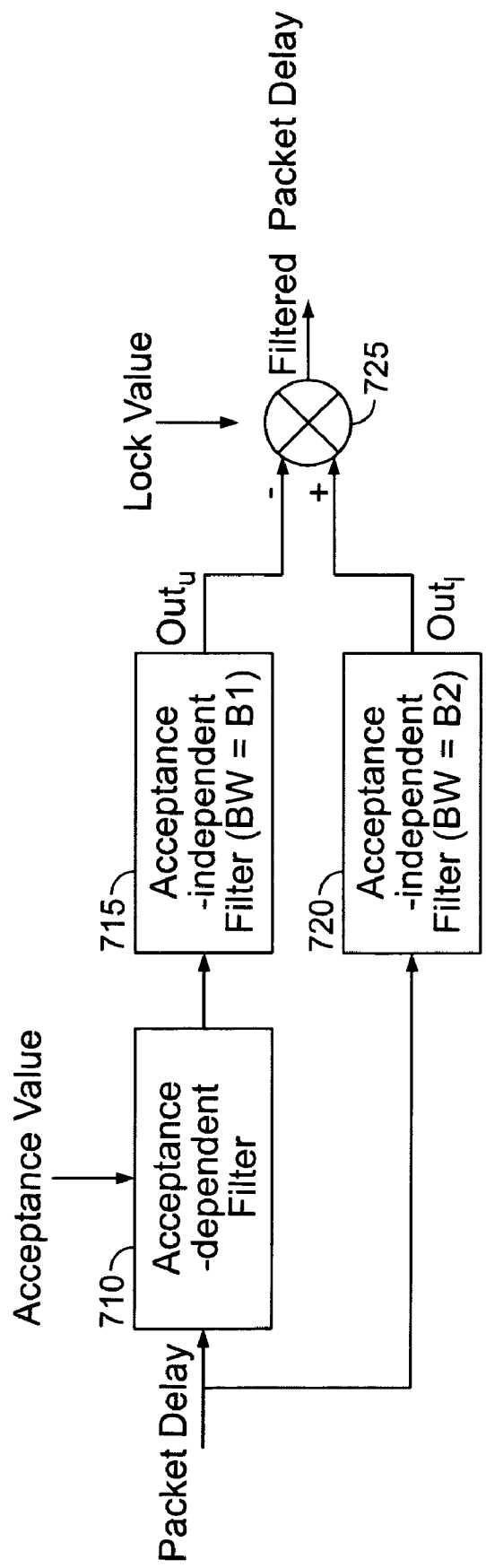
FIG. 7 illustrates an embodiment of an exemplary filter network for the time control mechanism.

FIG. 7 illustrates an embodiment in which three Infinite Impulse Response (IIR) filters are selected for the time control mechanism because this provides an optimization of the compromise between performance and simplicity of implementation. Alternative filters (e.g., a Finite Impulse Response filter having an array holding the filter's previous inputs with the output being the mean of the elements of the array) can also be used. The IIR filter allows the weighting procedure to be applied directly on each new sample, as shown below:

$$O_n = \frac{2\pi BA_n}{f_s}(I_n - O_{n-1}) + O_{n-1}$$

where,
$O_n$=new filter output
$O_{n-1}$=present filter output
$I_n$=new input value (apparent forward delay, $Tsf_n-Tmf_n$)
B=filter bandwith
$f_s$=sample rate
$A_n$=acceptance value for new input value.

As shown in FIG. 7, the filters include acceptance-dependent filter 710, acceptance-independent filter 715 and acceptance-independent filter 720. The packet delay is applied to both the acceptance-dependent filter 710 and the acceptance-independent filter 720. The output amplitude of the acceptance-dependent filter 710 varies with the strength of the acceptance value, $A_n$. The acceptance-independent filters 715 and 720 have $A_n$ set to unity. The bandwidth of each filter 710, 715 and 720 can be selected to suit specific applications. The outputs of the upper and lower branches shown in FIG. 7 are summed together according to the value of the 'Locked' signal, in accordance with the following expression:

Filtered_Packet_Delay=$L \times Out_u + (1-L) \times Out_l$.

The weighted average value of the return-path delay (the slave-to-master direction), $[Tmr_n-Tsr_n]_{wa}$, is obtained by filtering the output of the relative density weighted acceptance procedure when it is supplied with successive values of apparent return delay, $Tmr_n-Tsr_n$. The value, $Tmr_n$, is the value of the master clock when the master receives a delay-request packet from the slave. The value, $Tsr_n$, is the value of the slave clock when it sends the delay-request packet to the master. Each new delay-response packet generates a new value of apparent return delay, $Tmr_n-Tsr_n$. The values of apparent delay and acceptance are supplied to another compound filter and treated similarly to the forward path delay, described above. Again, an IIR filter was selected, but an alternative filter can also be used.

The most-likely round-trip delay could be obtained by summing the output of each filter together. The proportion that is allocated to the forward (master-to-slave) path could then be calculated. A difference between this value and the weighted average of the apparent forward delay values ($Tsf_n-Tmf_n$) would indicate a misalignment of the slave clock. The difference could be used to control the rate of the slave clock to bring it into alignment.

Figure 6:
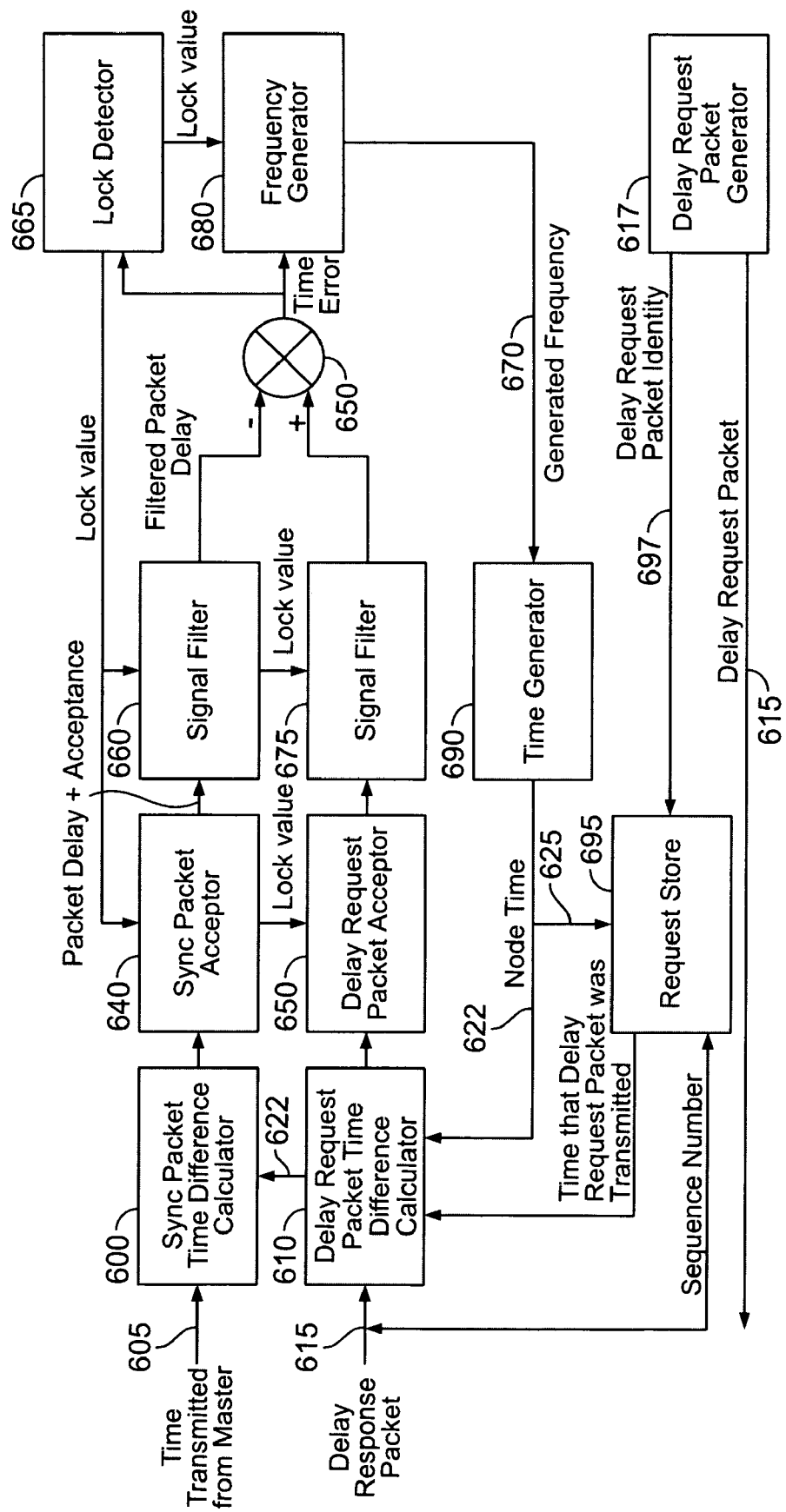
FIG. 6 illustrates a flow diagram of a system for achieving time alignment.

In an exemplary operational scenario according to the present invention, FIG. 6 shows how the alignment can be achieved. In the context of this exemplary scenario, the timing system comprises a master and slave processor. The master receives a timing reference signal and the slave maintains and puts out a copy of the time information contained in that signal. In this example, the master and slave are linked by an Ethernet network. The master and slave communicate using the IEEE 1588 protocol. The protocol contains Sync, Delay Request and Delay Response packets.

As is shown in FIG. 6, Sync Packet Time Difference Calculator 600 calculates a difference between the time at which a master clock transmitted a Sync packet 605 and the time at which this node received it. Delay Request Time Difference Calculator 610 calculates a difference between the time at which this node transmitted a Delay Request packet 615 and the time at which the master received it. Sync Packet Acceptor 640 and Delay Request Packet Acceptor 650 each determines whether the time differences between the master and each of these nodes (calculated from information in the received packets) are true reflections of the difference in the time between the local times of each of these nodes and its master. Signal Filter 660 uses the time differences calculated to generate an average difference between the node times of this node and its master. Frequency Generator 680 uses the average time difference between this node and its master to generate a frequency 670. The Time Generator 690 (which in one embodiment can be implemented entirely in the hardware) counts transitions of the generated frequency to provide the Delay Request Packet Time Difference Calculator 610 a node time 622. Request Store 695 holds a time of transmission 625 and the identity 697 of the transmitted packet 617 when the Delay Request packet is transmitted. The identity 697 is a 16-bit sequence number. When a client provides a packet identity matching the stored identity 697, the request store 695 returns the corresponding stored time of transmission 625.

More specifically, the Request Store 695 holds a list of outstanding delay requests. The list holds the sequence number and transmission time of each delay request. When a sequence number is presented to it, the Request Store 695 responds with the transmission time of the corresponding request. It then deletes that record and any older records.

In one embodiment, each Packet Acceptor 640, 650 can also remove packets that are deemed to not be carrying reliable time information. The decision is made by comparing the time information in a packet with time information in other packets. In a more specific embodiment, each Packet Acceptor 640, 650 comprises a Density Packet Acceptor. The Density Packet Acceptor provides a number between 1 and 0. This number indicates the degree to which the packet has been accepted, in which 1 indicates total acceptance and 0 indicates total rejection.

In the following description of an embodiment of the invention, the following parameters are used to define the Density Packet Acceptor, in which:

N=the number of packet delays stored in each acceptor
L=the number of lists that are part of each acceptor
NL=the number of packet delays stored in each list=N/L
$\rho_1$=the density of values stored in list 1
$\rho_{max}$=the maximum value of $\rho 1$ of all the lists of the acceptor
$\Delta_{max1}$=the maximum delay value stored in list 1
$\Delta_{min1}$=the minimum delay value stored in list 1
$A_1$=the degree of acceptance accorded to a packet whose delay is added to List 1.

The Density Packet Acceptor stores the previous N packets that have been received in one of L equal-sized lists. All the packets in list i were received with a greater delay than those in i-1. The density of each list is calculated $$\rho_l = \frac{N_l}{(\Delta_{max_l} - \Delta_{min_l})},$$

in which $\rho_1$ is units of packets/sec. This value measures the range of delays suffered by the packets and does not refer to the rate of packet reception. That is, $\rho_1$ refers to the distribution of delays of a number of received packets. If $N_1$=0, $N_1$=1 or $\Delta max_1 = \Delta min_1$, then $\rho_1$=0. The relative density of each list is calculated by dividing its density by the density of the densest list. The delay experienced by a newly received packet is added to the appropriate acceptor list (list "1") and the relative density of that list, $$\left(\frac{\rho_l}{\rho_{max}}\right)$$

is used to generate the degree of acceptance ($A_1$), using the relation $$A_l = e^{-50\left(1-\frac{\rho_l}{\rho_{max}}\right)^5}.$$

Figure 9:
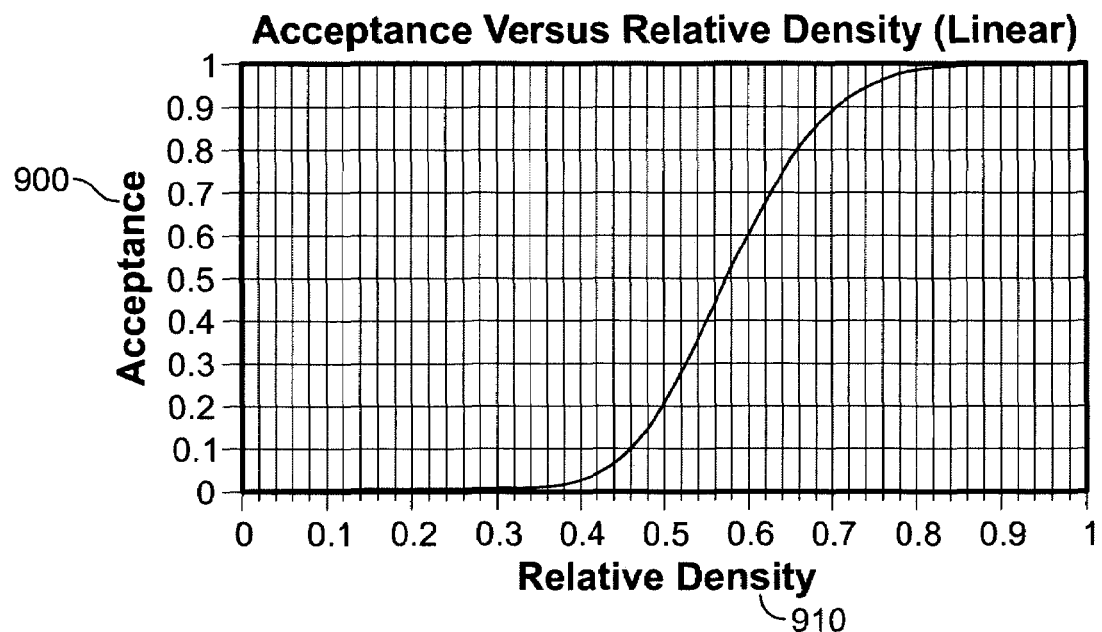
FIG. 9 is a linear graph of acceptance degree versus relative packet density of a density packet acceptor.
Figure 10:
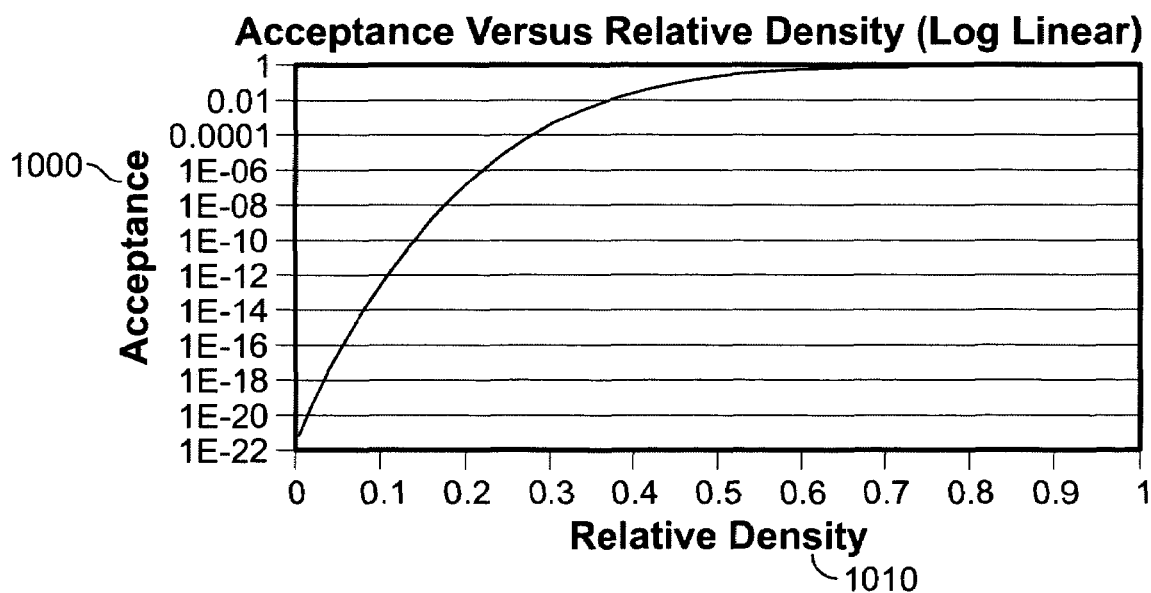
FIG. 10 is a log linear graph of acceptance degree versus relative packet density of a density packet acceptor.

The relationship of $A_1$ 900, 1000 to relative density 910, 1010 is graphed in FIGS. 9 and 10, respectively.

Referring back to FIG. 6, the Sync Packet Time Difference Calculator 600 and the Delay Request Time Difference Calculator 610 calculate the latest estimates of the forward path delay, $Tsf_n - Tmf_n$, and the reverse path delay, $Tmr_n - Tsr_n$, respectively. These estimates pass through the Packet Acceptors 640, 650 and the Filter 660 and are subtracted from each other by subtractor 650 to provide a time error control signal to adjust the slave time. Subtracting the two delay values gives the correct control signal because $Dsf_n = (Ts_n - Tm_n)$, and when $Dsf_n = ((Tsf_n - Tmf_n) + (Tmr_n - Tsr_n))/2$, then $((Tsf_n - Tmf_n) - (Tmr_n - Tsr_n)) = 0$. If the slave time begins to depart from alignment, the control signal becomes non-zero and pulls the slave time back into alignment.

The above description is an illustration of the basic operation of an exemplary algorithm according to the present invention. Other modifications may be made to the algorithm in order to achieve certain performance characteristics for the time control mechanism. For example, when a slave clock is first switched on, or following a catastrophic event in the network, the time control mechanism may be allowed to rapidly adjust its time by adopting what is contained in an early sync packet. Beyond this, however, the slave should change its time very slowly, in order to provide a relatively stable rate of change of time. This is required by many services that can use the time control mechanism because these services cannot accept changes that occur too rapidly. For example, some services may not accept negative time steps. Other applications may require the time control mechanism to align within a reasonable time. For example, a telecommunications system clock may have only 100 seconds to align within the desired performance targets. These contradictory requirements can be solved by an algorithm of the present invention as will be described in more detail below.

C. Response To Network Changes

Occasionally, the path through the network may have to change, for example, to route around congestion points or failures. This will change the delay and will put the slave clock out of alignment with the master unless corrective action is taken. An algorithm of the present invention recognizes the change in the delay via a delay-request procedure and automatically compensates, thereby maintaining alignment. Naturally, there is a delay in the compensation that leads to a temporary offset, but this is contained within bounds (that can be defined).

The time control mechanism requires the path through the network be stable at least until it has completed the alignment procedure. The time control mechanism should not align the slave to the master if the path changes during the alignment procedure.

D. The Relative Density Weighted Acceptance Procedure

To ensure that the algorithm of the present invention gives precedence to those packet delays that are nearer to the most-likely delay value, the apparent delays are loaded into a series of lists, each list containing those delays that fit into a small subdivision of the total delay range. In an embodiment of the algorithm according to the present invention, a total of ten lists have been used, and a total of 2000 packet delays are maintained. When a new packet is received by the slave, its delay is loaded into the list that contains similar delays, and the lists are rearranged if necessary. The depth of the lists changes according to the quality of the locking, as indicated by the value L defined in the description of the Locking Detector section below. When acquiring alignment, only a few packet delays are used. Then, when alignment has been much improved, more and more packet delays are used, until all 2000 are involved.

In the above embodiment, only 200 packet delays are used when the value of L is less than 0.6, then gradually more packet delays are used until, when L is greater than 0.9, all 2000 packet delays are used. This time control mechanism improves the speed of alignment while maximizing noise immunity once locked. Other selections of number of packet delays used versus the value of L can be used to suit different situations. Once 2000 packets have been received, the first list would contain, at any one time, the shortest delays, the second list would contain the next-shortest delays, and so on. Since there are ten lists, each list would naturally contain a tenth of the delay samples. For example, the maximum delay value in the first list is the first decile, meaning that all the delay values contained in the first list are the two hundred smallest delays.

The tenth list contains the longest delays. This particular arrangement has been chosen for implementation convenience and other embodiments of the algorithm can use alternative arrangements, for example, 100 lists can contain 100 delay values each.

A mix of arrays and pointers is used to store the data required by the packet acceptance algorithm in the lists. The requirement is that elements are ordered according to the delay that they suffered, but when an element must be discarded, the oldest element must be selected. The first requirement favors the use of a linked list, as elements must be inserted between others. The second requirement favors the use of an array, as elements must be created and discarded in order. The combination of the doubly linked list and array allows the advantages of both systems to be gained. Each list is implemented as a conventional doubly linked list.

Figure 8:
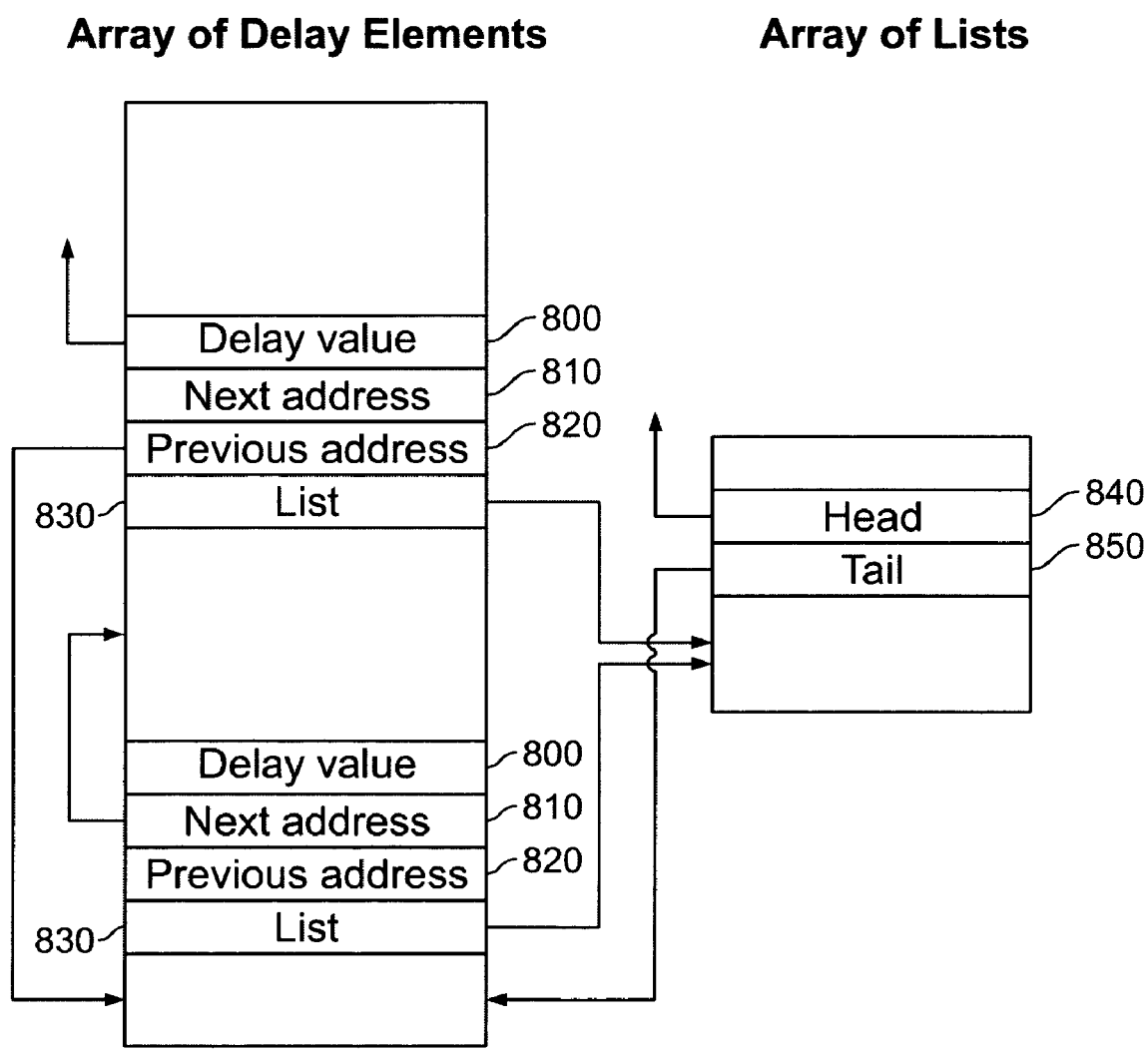
FIG. 8 illustrates arrays and pointers for feeding and emptying packet acceptance data in accordance with an exemplary embodiment of the invention.

As shown in FIG. 8, the elements of the list include: (a) the delay value 800 representing the delay suffered by the packet; (b) the next address value 810 representing the address of the next element in the list; (c) the previous address value 820 representing the address of the previous element in the list; (d) the list value 830 representing the address of the list of which this element is a member. All elements are stored in an array, allocated in order of address. When an element is to be discarded, the least recently allocated element is selected. When an element is allocated, the lists are searched in turn to find the correct list. The element's next and previous pointers, those of its neighbors and, if necessary, the head and tail pointers of the list are modified to insert the element into its correct place in the list. In addition, the list element is updated to point to the list that holds the element. When an element is discarded, its list pointer is used to find the list that holds it, the list is then searched to find the element and the element is removed from the list.

The table below shows a significant reduction in the required number of operations. Assuming:

| Operation | Mean number of operations - using linked lists alone | Mean number of operations - using the combination |
|---|---|---|
| Inserting an element | L/2 pointer dereferences<br>L/2 comparisons<br>E/L/2 pointer dereferences<br>E/2 comparisons<br>4 pointer updates | L/2 pointer dereferences<br>L/2 comparisons<br>E/L/2 pointer dereferences<br>E/2 comparisons<br>5 pointer updates |
| Discarding an element | E/2 pointer dereferences<br>E/2 comparisons<br>2 pointer updates | 2 pointer updates |

L = lists
E = elements
E/L = elements per list

In steady-state conditions, once the lists are completely filled, every time a new delay sample arrives, it must be inserted into its rightful place and the oldest element discarded. The key benefit of the approach described above is that the resources needed to discard an element are considerably reduced compared to alternative methods, thereby freeing-up resources for other purposes.

Once the delay values have been ordered into their lists, the density of each list is calculated. In the context of this embodiment, the term density means the number of delay values stored in the list divided by the range of delay values held in the list. The density is thus a measure of how closely the list's delay values are to each other. The relative density is calculated by dividing the density of each list by the density of the highest-density list, giving relative density values between 0 and 1. The relative density is a normalization of the densities of the lists. The density and relative density calculations are performed each time a new packet is received. The highest-density list probably encloses the most-likely delay value.

Once the relative densities are available, the delays in each list are weighted using the relation, $$A_l = e^{-50\left(1 - \frac{\rho_l}{\rho_{\max}}\right)^5},$$

and are summed into the filter. This procedure gives greater importance to those delays that are closer to the average delay value and gives less importance to those that are farther away. By reducing the importance of outlying delays, the algorithm finds the most-likely delay much more quickly. The relation given here is used in the present embodiment of the invention, but other relations may be used in its place to suit particular applications or operating conditions. It is also possible to adapt the relation according to operating conditions.

E. Lock Detector

Referring now back to FIG. 6, Lock Detector 665 is also shown. The Lock Detector 665 maintains a signal termed "Locked," which has an initial and minimum value of zero, indicating the node 665 is completely unlocked, and a maximum value of one, indicating the node is completely locked. In an embodiment of the present invention, the Lock Detector 665 is used to modify the relative gains of a Proportional, Integral and Differential controller (PID) controller, used to control the slave output frequency in response to the alignment quality of the slave, and to adjust the population size of the delays in the lists. The Lock Detector 665 helps to shorten the alignment time, provide a sensible time to unlock under network changes, and boost immunity to false loss of alignment.

The "Locked" signal is used to reduce the relative gain of the PID controller if the integral of phase error from the time that the phase error last changed sign or the value increases beyond a threshold value, "P," or increases the relative gain of the PID controller if the integral of phase error has not been greater than P for a period of time, "T." In an embodiment of the invention, "Locked" reduces in steps of 4% (i.e., Locked=Locked−0.04) if the integral of phase error increases above $P=20\times10^{-6}$ seconds$^2$, or increases by 4% (Locked=Locked+(1-Locked)×0.04) if the period, T=10 seconds, is exceeded while the phase error has not been grater than P. Other values for the increment, decrement, P or T can alternatively be selected.

F. Frequency Generator

The Frequency Generator 680 shown in FIG. 6 receives a filtered (stabilized) phase error (difference between the time seen on this node and the time seen on the master) and sets the frequency of the node's time reference to minimize this value in the future. The frequency generated by this node is the sum of three terms: 1) the product of the input and the proportional gain (proportional path); 2) the integration of the product of the input and the integral gain (integral path); and 3) the product of the rate of change of the input and the differential gain (differential path). The differential gain will take one of two values, one if the signs of the input and rate of change of the input are the same (the input is becoming bigger) and the other if the signs are different.

Specifically, the Frequency Generator 680 is responsible for generating the rate of change of the slave clock. An embodiment of the invention uses a Direct Digital Synthesis (DDS) technique to get very fine resolution of frequency control. A PID controller is used to change the behavior of the generator to suit the alignment state of the slave. The proportional path responds to the magnitude of the phase error (which is the difference between the slave time and the master time). The integral path responds to the integral of the phase error. The differential path responds to the change in the phase error. Accordingly, the present embodiment provides a way gains of the PID paths are mixed according to the alignment state using the DDS and PID techniques known in the art.

As described above, the PID paths should comprise a proportional path, an integral path, and a differential path. The three paths are shown below with their respective signals and characteristics.

| Signal | Proportional Path | Integral Path | Differential Path |
| --- | --- | --- | --- |
| Step phase change | Good | Bad, causes overshoot | Good |
| Step frequency change | Good, but gives a constant phase error | Good | Little effect |
| Gaussian noise | Bad | Bad, but less bad than the other terms | Bad |

The three paths are mixed in different ways according to the state of the slave alignment. As shown below, this mixing is controlled by the signal, "Locked," which is supplied by the Lock Detector 665 described above.

| Path | Unit | | Gain (with a packet period of P seconds) |
| --- | --- | --- | --- |
| Proportional | Hz | | $G_P = K1L + K2(1 - L)$ |
| Integral | Hz$^2$ | | $G_I = P(K3L + K4(1 - L))$ |
| Differential | Dimensionless | $G_D = 0$ | $L \geq K5$ |
| | | $G_D = 0$ | Phase error and rate of change of phase error are of different sign (i.e. phase error is decreasing |
| | | $G_D = K7(K6 - L)$ | Otherwise |

In the above table, the constant values K1-K7 can be varied to adapt the response to various conditions and applications. The output of the Frequency Generator 680 is the ratio of required frequency to the nominal frequency generated by the local oscillator. In the present embodiment the following values have been chosen:

The above values give a good response to step changes in phase and frequency while the slave is not locked, and give good immunity to Gaussian noise while locked (e.g., by the TLL described above). The Frequency Generator 680 can produce a number of frequencies at the same time, all controlled by the alignment algorithm and therefore locked to the rate of change of master time. When the link to the master is interrupted, the Frequency Generator 680 can maintain a frequency based on its past history and the stability of a local oscillator. This is termed the holdover mode (described in more detail below).

G. Time Generator

The Time Generator 690 generates the slave time in a variety of formats. It can adopt the latest sample of master time if permitted, but it generally increments at a rate controlled by the Frequency Generator 680. If slave time needs to move forward, the Frequency Generator 680 will produce a slightly faster clock rate; if slave time needs to fall back, the Frequency Generator 680 will slow slightly.

H. Holdover

If the slave clock becomes detached from the master, it is able to hold its output rate (rate of change of slave time) to within a very tight proportion of that when it is aligned. In the context of an embodiment of the present invention, holdover is typically intended to be used when the slave can no longer receive packets from the master. It attempts to maintain slave time within bounds until the path is restored. It is also useful over shorter periods, such as to protect the slave time from temporary network disturbances.

I. Change Of Network Paths

When the path through the network between the master and slave changes, the new path will typically have a different delay profile. The delay calculation notes that the network has changed and compensates by absorbing the difference in one-way delay to maintain slave time aligned to the master. The same thing occurs when the master clock fails and is replaced by an alternative. In the former case (i.e., changing network path), a time control mechanism in accordance with the present invention can enter a holdover mode (described above) while it calculates the new delay values. Note that this provides a phase build-out feature so that the slave clock retains its rate and alignment with the master even though the path delay has changed. In the latter case (i.e., changing master), the time control mechanism can accept packets from the standby master clock and calculate the delays in advance of any switch-over. Note that this case, which is a form of source-switching (even if some parts of the path remain as before), allows the slave to retain its rate and alignment with real time (within the accuracy of the new master) even though a new master (and new path) has been adopted).

Applications

A time control mechanism of the present invention can be applied in many areas. In general, anywhere in which a copy of time or a desired stable frequency, locked to a remote point, is required can use a time control mechanism of the present invention. For example, wireless basestations that back-haul their traffic to a radio network controller can use a time control mechanism of the present invention to provide: (a) UTC for various timestamping activities associated with wireless networks; and (b) a reference clock to drive the air interface frequencies. This can be used in a stand-alone way or can be used in conjunction with a local GPS receiver as a reliable back-up in case of failure or unavailability of the GPS equipment. The use of a time control mechanism of the present invention allows the link to be converted to newer transmission technologies, such as Ethernet, or to overcome the troublesome phase transients that occur on links that are conventionally dropped out of SONET or SDH 'signals.

Another example would be industrial control networks where various machines or processes can be more easily controlled relative to a common distributed time signal rather than relative to each other.

Another example can be distribution of timing signals within equipment using, for example, a shared Ethernet link rather than dedicated links, thereby simplifying timing distribution and reducing costs.

A final example can be to provide a copy of a timing signal in remote equipment that is connected into a network via a link that inherently would not support conventional techniques; for example, an Ethernet link into a building would not normally be able to carry a network timing signal but, by sending samples of time from the network to a time control mechanism of the present invention in the building, a copy of network time can be easily obtained that can be used to adapt real-time services to a non-real-time network.

All of the above examples may be satisfied by the Timeserver master/slave system defined in IEEE 1588, for which the invention described herein may be used.

The performance in each application may be adapted to suit the requirements of the application and this can achieve better cost/performance objectives. In addition, the applications described above are for purposes of example only and the invention is not limited thereby.

Having thus described the preferred embodiments of the system and method for controlling time using the time control mechanism of the present invention, it should be apparent to those skilled in the art that certain advantages of the described system and method have been achieved. It should also be appreciated that various modifications, adaptations and alternative embodiments thereof may be made within the scope and spirit of the present invention.

What is claimed is:

1. A method for aligning time references in a communications network comprises:
   at a master device of the communications network:
      generating a message timestamp comprising at least a sample of a master clock source;
      inserting the message timestamp into the message at a predetermined message timestamp point; and
      sending the message to at least one slave device of the communications network; and
   at a slave device of the communications network:
      receiving the message;
      generating a clock timestamp corresponding to a time the message timestamp point passes a predetermined clock timestamp point as measured by a slave clock source;
      quantifying a measure of transmission path delay from a comparison between the message timestamp and the clock timestamp;
      weighting the measure of transmission path delay with a density acceptance factor, wherein the density acceptance factor is determined by:
         loading the measures of transmission path delay into at least one linked list ordered in accordance with delay magnitude; and
         comparing a number of measurements of transmission path delay in the at least one linked list with a range of delay magnitude; and
      adjusting the slave clock source responsive to the weighted measurement.

2. The method of claim 1, wherein the step of receiving the message further comprises receiving the message at message stack of the slave device, the message stack including the clock timestamp point.

3. The method of claim 1, wherein the step of generating a clock timestamp further comprises:
   detecting the message timestamp contained in the message;
   latching a time value of the slave clock source corresponding to the time of detection of the message timestamp; and
   inserting the time value into the message.

4. The method of claim 3, wherein the step of inserting the time value further comprises inserting the time value in place of a cyclic redundancy check (CRC) value of the message.

5. The method of claim 1, wherein the message comprises at least one of a Sync message and a Delay Request message.

6. The method of claim 1, wherein the step of generating a message timestamp further comprises:
   latching a time value of the master clock source corresponding to the time of generation of the timestamp; and
   inserting the time value into the message at the message timestamp point.

7. The method of claim 1, wherein the step of quantifying a measure of transmission path delay further comprises determining fixed delay and variable delay components of the transmission path delay.

8. The method of claim 1, wherein the step of weighting the measure of transmission path delay further comprises generating a weighted average of transmission path delay.

9. The method of claim 1, wherein the step of weighting the measure of transmission path delay further comprises filtering the measure of transmission path delay.

10. A method for aligning slave clock time references to a master clock time reference in a communications network comprises:
    receiving plural messages sent by a master device via the communications network, each one of the plural messages including a message timestamp comprising at least a sample of the master clock time reference inserted into the message at a predetermined message timestamp point;
    for each one of the plural messages, generating a clock timestamp corresponding to a time the message timestamp point passes a predetermined clock timestamp point as measured by the slave clock time reference, calculating a message delay corresponding to a time difference between the message timestamp and the clock timestamp, and weighting the calculated message delay in accordance with previous calculations of message delay from among the plural messages; and
    adjusting the slave clock time reference responsive to the weighted calculations;
    wherein the step of weighting the calculated message delay further comprises loading the delay calculations into at least one linked list ordered in accordance with magnitude of delay, and comparing a number of message time delay measurements in the at least one linked list with a range of delay magnitude.

11. The method of claim 10, wherein the step of receiving the plural messages further comprises receiving the messages at a message stack of a slave device, the message stack including the clock timestamp point.

12. The method of claim 10, wherein the step of generating the clock timestamp further comprises:
    detecting the message timestamp contained in at least one of the plural messages;
    latching a time value of the slave clock time reference corresponding to the time of detection of the message timestamp; and
    inserting the time value into the at least one of the plural messages.

13. The method of claim 12, wherein the step of inserting the time value further comprises inserting the time value in place of a cyclic redundancy check (CRC) value of the at least one of the plural messages.

14. The method of claim 10, wherein each one of the plural messages comprises at least one of a Sync message and a Delay Request message.

15. The method of claim 10, wherein the step of calculating the message delay further comprises determining fixed delay and variable delay components of the message delay.

16. The method of claim 10, wherein the step of weighting the message delay calculations further comprises eliminating ones of the message delay calculations determined to not be reliable.

17. The method of claim 10, further comprising determining a relative density value for the at least one linked list.

18. The method of claim 10, further comprising selectively discarding one of the message delay calculations from the at least one-linked list.

19. The method of claim 18, wherein the step of selectively discarding one of the plural message delay calculations further comprises discarding an oldest one of the plural message delay calculations.

20. The method of claim 10, further comprising determining a density of each one of the at least one linked list corresponding to number of message delay calculations contained in the linked list divided by range of message delay calculations contained in the linked list.

21. The method of claim 20, further comprising determining a relative density between plural linked lists.

22. The method of claim 10, wherein the step of adjusting the slave clock time reference further comprises changing a frequency of the slave clock time reference.

23. A method for aligning a slave clock time references to a master clock time reference in a communications network comprises:

receiving plural messages sent by a master device via the communications network, each one of the plural messages including a message timestamp comprising at least a sample of the master clock time reference inserted into the message at a predetermined message timestamp point;

for each one of the plural messages, generating a clock timestamp corresponding to a time the message timestamp point passes a predetermined clock timestamp point as measured by the slave clock time reference, calculating a message delay corresponding to a time difference between the message timestamp and the clock timestamp, and weighting the calculated message delay in accordance with previous calculations of message delay from among the plural messages; and adjusting the slave clock time reference responsive to the weighted calculations wherein the step of weighting the calculated message delay further comprises determining a weighted average of the message delay and filtering the message delay calculations by weighing each message delay calculation in accordance with the following expression:

$$O_n = \frac{2\pi BA_n}{f_s}(I_n - O_{n-1}) + O_{n-1}$$

where, $O_n$=new filter output $O_{n-1}$=present filter output $I_n$=new input value (apparent forward delay, $Tsf_n-Tmf_n$)

B=filter bandwith $f_s$=sample rate $A_n$=acceptance value for new input value.

* * * * *